US009934692B2

(12) United States Patent
Lacko et al.

(10) Patent No.: US 9,934,692 B2
(45) Date of Patent: Apr. 3, 2018

(54) DISPLAY SYSTEM AND METHOD FOR GENERATING A DISPLAY

(75) Inventors: Ivan Lacko, Cana (SK); Claudia Keinrath, Graz (AT); Frantisek Mikulu, Znojmo (CZ); Yujia Cao, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 998 days.

(21) Appl. No.: 13/590,503

(22) Filed: Aug. 21, 2012

(65) Prior Publication Data

US 2013/0218374 A1 Aug. 22, 2013

Related U.S. Application Data

(60) Provisional application No. 61/601,819, filed on Feb. 22, 2012.

(51) Int. Cl.
*B64D 45/08* (2006.01)
*G08G 5/00* (2006.01)
*G08G 5/02* (2006.01)

(52) U.S. Cl.
CPC ........... *G08G 5/0021* (2013.01); *G08G 5/025* (2013.01)

(58) Field of Classification Search
CPC ................ B64C 2201/141; B64G 3/00; B64G 2001/24; G01C 21/265; G01C 21/365; G01C 23/00; G01C 23/005; G08G 5/02; G08G 5/025
USPC .................. 701/3–7, 14, 16, 120; 244/17.17, 244/180–183, 202, 81
See application file for complete search history.

(56) References Cited

U.S. PATENT DOCUMENTS 3,559,481 A * 2/1971 Vietor .................... G01C 23/00
4,319,219 A 3/1982 Rein-Weston
6,112,141 A * 8/2000 Briffe .................... G01C 23/00 345/1.3
6,584,382 B2 6/2003 Karem
6,629,023 B1 9/2003 Silder, Jr. et al.
7,068,187 B2 6/2006 Ishihara et al.
7,132,960 B2 11/2006 Glover
7,212,135 B1 * 5/2007 Lynch .................. G08G 5/0065 244/183

(Continued)

OTHER PUBLICATIONS

EP Search Report for Application No. 13154950.3-1810/2654029 dated Jun. 10, 2016.

(Continued)

*Primary Examiner* — Atul Trivedi
(74) *Attorney, Agent, or Firm* — Lorenz & Kopf, LLP

(57) ABSTRACT

A flight display system and method for generating a flight display. A method for generating a flight display includes determining a position of an aircraft with reference to an airport, calculating a distance required for the aircraft to decelerate and descend for entering a final approach gate of the airport in a stabilized configuration, comparing the position of the aircraft with the distance required for the aircraft to decelerate and descend, and generating a flight display comprising an advisory based on a result of the comparing. A flight display system includes a database, an electronic display device, and a computer processor. The database and the electronic display device are in operable communication with the computer processor for displaying the flight display on the electronic display device.

20 Claims, 7 Drawing Sheets

(56) References Cited

U.S. PATENT DOCUMENTS

| | | | | | |
|---|---|---|---|---|---|
| 7,436,323 | B2 | 10/2008 | Ishihara et al. | | |
| 7,471,997 | B2 | 12/2008 | Tezuka | | |
| 7,647,140 | B2 | 1/2010 | Demortier et al. | | |
| 7,957,878 | B2 | 6/2011 | Rado | | |
| 8,014,912 | B2 | 9/2011 | Zadrozynski et al. | | |
| 8,024,078 | B2 * | 9/2011 | Coulmeau | G08G 5/0013 | 244/75.1 |
| 8,126,599 | B2 * | 2/2012 | Coulmeau | G08G 5/0039 | 340/961 |
| 8,126,600 | B2 * | 2/2012 | Conner | G08G 5/02 | 701/14 |
| 8,170,727 | B2 * | 5/2012 | Deker | G05D 1/0676 | 244/180 |
| 8,436,750 | B2 * | 5/2013 | Fabre | G08G 5/0086 | 340/951 |
| 2002/0039070 | A1 | 4/2002 | Ververs et al. | | |
| 2004/0044446 | A1 * | 3/2004 | Staggs | G05D 1/0676 | 701/16 |
| 2005/0261813 | A1 * | 11/2005 | Ryan | B64C 25/426 | 701/16 |
| 2006/0025901 | A1 | 2/2006 | Demortier et al. | | |
| 2006/0200279 | A1 * | 9/2006 | Ainsworth | G08G 5/025 | 701/16 |
| 2006/0265110 | A1 * | 11/2006 | Ferro | G01C 23/00 | 701/3 |
| 2007/0142982 | A1 * | 6/2007 | Lorido | G08G 5/025 | 701/16 |
| 2008/0140272 | A1 * | 6/2008 | Zadrozynski | G08G 5/0021 | 701/14 |
| 2008/0162092 | A1 * | 7/2008 | Coulmeau | G05D 1/0676 | 703/2 |
| 2008/0195301 | A1 * | 8/2008 | Fabre | G08G 5/0021 | 701/120 |
| 2008/0249675 | A1 * | 10/2008 | Goodman | B64C 25/426 | 701/16 |
| 2008/0262665 | A1 * | 10/2008 | Coulmeau | G08G 5/0039 | 701/16 |
| 2009/0018713 | A1 * | 1/2009 | Coulmeau | G08G 5/0013 | 701/3 |
| 2009/0043434 | A1 * | 2/2009 | Deker | G05D 1/0676 | 701/16 |
| 2009/0048724 | A1 | 2/2009 | Caule | | |
| 2009/0319105 | A1 * | 12/2009 | Conner | G08G 5/02 | 701/16 |
| 2010/0036551 | A1 | 2/2010 | Lacaze et al. | | |
| 2010/0191394 | A1 * | 7/2010 | Villaume | G05D 1/0083 | 701/16 |
| 2010/0286852 | A1 | 11/2010 | Bouquet | | |
| 2010/0318244 | A1 * | 12/2010 | Gomez | G01C 21/00 | 701/3 |
| 2011/0082605 | A1 * | 4/2011 | Coulmeau | G08G 5/045 | 701/14 |
| 2011/0166723 | A1 * | 7/2011 | Valentova | G08G 5/02 | 701/16 |
| 2011/0202208 | A1 * | 8/2011 | Karnik | G07C 5/0816 | 701/7 |
| 2012/0053760 | A1 | 3/2012 | Burnside et al. | | |
| 2013/0204470 | A1 | 8/2013 | Luckner et al. | | |
| 2014/0343765 | A1 | 11/2014 | Suiter et al. | | |
| 2014/0343766 | A1 | 11/2014 | Le Gall et al. | | |
| 2016/0004374 | A1 | 1/2016 | Kneuper et al. | | |

OTHER PUBLICATIONS

EP Exam Report for 13154950.3 dated Jun. 22, 2016.

Extended EP Search Report for Application No. 16199228A-1803 dated Apr. 26, 2017.

USPTO Office Action for U.S. Appl. No. 14/967,557 dated Dec. 13, 2017.

* cited by examiner

All flights must be stabilized by 1,000 ft above airport elevation in instrument meteorological conditions (IMC) and by 500 ft above airport elevation in visual meteorological conditions (VMC). An approach is stabilized when all of the following criteria are met:

1. The aircraft is on the correct flight path;
2. Only small changes in heading/pitch are required to maintain the correct flight path;
3. The aircraft speed is not more than $V_{REF}$ +20 kt indicated airspeed and not less than $V_{REF}$;
4. The aircraft is in the correct landing configuration;
5. Sink rate is no greater than 1,000 fpm; if an approach requires a sink rate greater than 1,000 fpm. a special briefing should be conducted;
6. Power setting is appropriate for the aircraft configuration and is not below the minimum power for approach as defined by the aircraft operating manual;
7. All briefings and checklists have been conducted;
8. Specific types of approaches are stabilized If they also fulfill the following: instrument landing system (ILS) approaches must be flown within one dot of the glideslope and localizer; a Category II or Category III ILS approach must be flown within the expanded localizer band; during a circling approach, wings should be level on final when the aircraft reaches 300 ft above airport elevation; and.
9. Unique approach procedures or abnormal conditions requiring a deviation from the above elements of a stabilized approach require a special briefing.

An approach that becomes unstabilized below 1,000 ft above airport elevation in IMC or below 500 ft above airport elevation in VMC requires an immediate go-around.

FIG. 1
(PRIOR ART)

DISPLAY SYSTEM AND METHOD FOR GENERATING A DISPLAY

CROSS-REFERENCE TO RELATED APPLICATIONS

The present application claims the benefit of priority to U.S. provisional patent application Ser. No. 61/601,819, titled "DISPLAY SYSTEM AND METHOD FOR GENERATING A DISPLAY," filed Feb. 22, 2012. The contents of said application are herein incorporated by reference in their entirety.

TECHNICAL FIELD

The present disclosure relates generally to an electronic display. More particularly, embodiments of the present disclosure relate to a flight display system and a method for generating a flight display during approach procedures to assist the flight crew in performing the approach procedures.

BACKGROUND

Modern jet aircraft require a stabilized approach when on "short final" (i.e., is within a few miles of the airport and is aligned with the runway) in order to be in a "safe to land" situation. Nine specific criteria for a stabilized approach, promulgated by the Flight Safety Foundation, are provided in tabular form in FIG. 1. General reference to these criteria, nominated criteria 1 through 9 as depicted in FIG. 1, will be made in the description of the invention that follows. Achieving a stabilized approach can be a challenging task, especially in certain circumstances such as adverse weather conditions, on-board malfunctions, low quality of air traffic control (ATC), bad crew cooperation, fatigue, visual illusions, inexperienced crew members, and others as will be known to those having ordinary skill in the art.

Currently, flight crews rely only on memorized manuals and acquired experience in performing approaches. If a stabilized approach is not performed, regulations require the crew to commence a "go-around" procedure. It is known that flight crews occasionally disobey the regulations, possibly in order to meet "on-time" metrics and/or possibly due to the costs associated with executing a "go-around" procedure. Further, flight crews in an unstabilized approach situation may believe that they will stabilize the aircraft in time for a safe landing.

There are several known incidents where flight crews did not detect an unstabilized approach prior to landing. A statement from Flight Safety Foundation reads as follows: "Not every un-stabilized approach ends up as a runway excursion, but almost every runway excursion starts as an un-stabilized approach." It has been determined that an unstabilized approach was a causal factor in two thirds of all approach and landing accidents and incidents worldwide between 1984 and 1997. Since that time there has been a constant rise of traffic density around airports, extension of flight crew duty time, higher pressure on cost reductions. There has been no tool, or new technology, however, that could help flight crews to perform a safe approach and landing in terms of stabilization of the aircraft on final approach.

Another factor that has eluded solution in the art is the cost reduction that is achieved when an aircraft flies most of the approach with continuous speed reduction and, consequently, with minimum thrust. When flying an approach, currently flight crews try to "guess" the appropriate moment to extend the landing gear or flaps, while beneficially keeping the throttles on idle thrust to reduce fuel consumption. Because this estimate is not very precise, and because flight crews have other duties to attend to during the approach, they often act earlier than required by the situation, perhaps realizing that the benefit associated with a continuous deceleration is much smaller than costs for a potential go around procedure.

Another further issue that has eluded adequate solution in the art is noise abatement during the approach. With idle thrust, the aircraft would reduce noise in the corridor below the approach path. Again, the flight crew is typically not able to calculate the precise timing of flap and landing gear extension in such a way that throttles are on idle thrust for the most of the approach (until reaching the "final gate" for stabilization, where thrust needs to be above idle to ensure rapid acceleration in case of a potential go around). Due to this deficiency, there are several moments during the approach where throttles are moved forward and cause not only increased fuel consumption, but also undesirable noise.

Currently lacking in the art is an on-board display that is configured to guide the flight crew through the approach in order to reduce the chances of a "go-around," increase safety, reduce fuel consumption, and reduce noise over the approach corridor. As such, it would be desirable to provide a display system and method on an aircraft for improving approach procedures. It would further be desirable to provide a display system and method that provides information for improved approach procedures to the flight crew as a single display. Other desirable features and characteristics of the present invention will become apparent from the subsequent detailed description of the invention and the appended claims, taken in conjunction with the accompanying drawings and this background of the invention.

BRIEF SUMMARY

As used herein, the term "display" refers broadly to any means or method for the distribution of information to a flight crew or other aircraft operator, whether visually, aurally, tactilely, or otherwise.

A display system and method for providing a display are disclosed herein. In an exemplary embodiment, a method for generating a flight display includes determining a position of an aircraft with reference to an airport, calculating a distance required for the aircraft to decelerate and descend for entering a final approach gate of the airport in a stabilized configuration, comparing the position of the aircraft with the distance required for the aircraft to decelerate and descend, and generating a flight display comprising an advisory based on a result of the comparing.

In another exemplary embodiment, a computer-implemented flight display system includes a database, an electronic display device, and a computer processor. The computer processor is configured to: determine a position of an aircraft with reference to an airport, calculate a distance required for the aircraft to decelerate and descend for entering a final approach gate of the airport in a stabilized configuration, compare the position of the aircraft with the distance required for the aircraft to decelerate and descend, and generate a flight display comprising an advisory based on a result of the comparing. The database and the electronic display device are in operable communication with the computer processor for displaying the flight display on the electronic display device.

In an embodiment, calculating a distance required for the aircraft to decelerate and descend is performed using a computerized approach algorithm. In an embodiment, the computerized approach algorithm is configured to calculate a plurality of segment distances, each segment distance corresponding to an aircraft configuration change. In an embodiment, the computerized approach algorithm is configured to sum the plurality of segment distances to calculate the distance required for the aircraft to decelerate and descend. In an embodiment, the computerized approach algorithm is configured to calculate the plurality of segment distances based on one or more of an aircraft type, and aircraft weight, a weather condition, an aircraft airspeed, an aircraft altitude, and an aircraft configuration.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

At least one example of the present invention will hereinafter be described in conjunction with the following figures, wherein like numerals denote like elements, and wherein:

FIG. 1 is a prior art tabular listing of recommended elements of a stabilized approach as provided by the Flight Safety Foundation;

DETAILED DESCRIPTION

Figure 2:
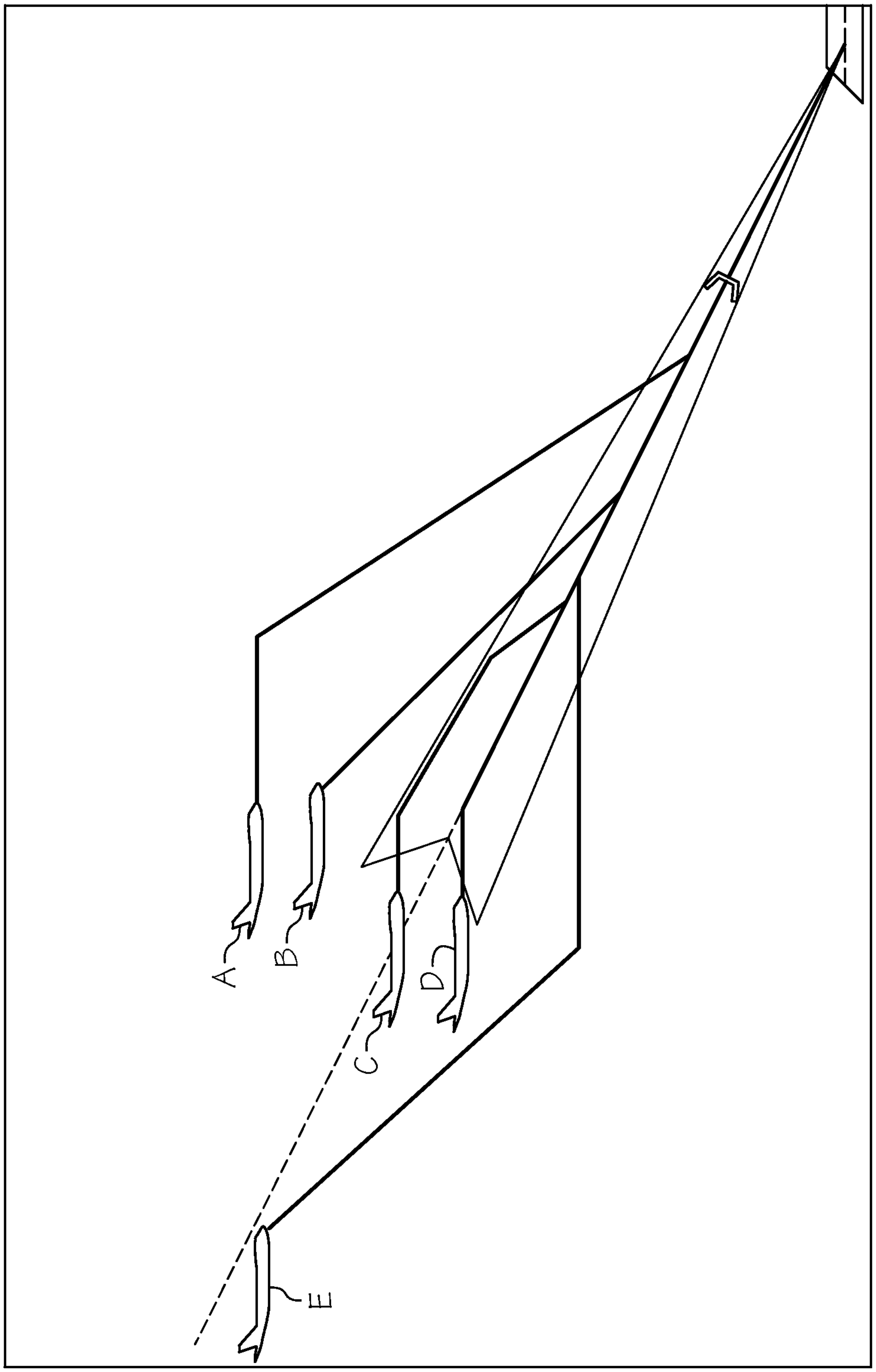
FIG. 2 illustrates various aircraft descent scenarios in accordance with embodiments of the present disclosure.

The following detailed description is merely exemplary in nature and is not intended to limit the invention or the application and uses of the invention. Furthermore, there is no intention to be bound by any theory presented in the preceding background or the following detailed description.

The present disclosure is directed to a display system and a method for generating a display to assist the flight crew of an aircraft in performing an approach to an airport in the most efficient manner possible. Embodiments of the present disclosure are based on an approach algorithm that takes into account the type of aircraft, the weight of the aircraft, current weather conditions (at the aircraft and at the airport), the position of the aircraft with regard to the airport, standard approach procedures, and current airspeed. As discussed above, it is often the case that the flight crew is not able to estimate precisely what distance the aircraft needs to decelerate from one speed to another while descending with a particular descent rate for a particular wind component in the current atmosphere, with or without speed-brakes, landing gear, future flaps, etc. However, the approach algorithm, as will be described in greater detail below, is configured to make such calculations many times per second, from the current position of the aircraft until touchdown. Based on the calculations performed by the approach algorithm, a display is provided to the flight crew, indicating the optimal times to perform various approach procedures, including but not limited to lowering flaps, applying speed brakes, extending the landing gear, etc.

The disclosed approach algorithm is configured to operate where the aircraft is several thousand feet above (destination) aerodrome level (AAL), for example at least about 5000 ft AAL, such as at least about 10000 ft AAL, or more preferably at least about 15,000 ft AAL. The approach algorithm provides flight crew instructions via the display down to 500 ft AAL. This number is not fixed, can be changed anytime. Also for circling approach it is 300 ft. As such, the flight crew is supported in flying the aircraft down to 500 ft in such a way that the stabilized approach criteria are met (referring to FIG. 1) at the stabilization height so that the last 500 ft down to the ground can be flown in a stabilized configuration.

In one aspect, embodiments of the present disclosure, using the aforementioned approach algorithm, calculate optimum deceleration profile on given vertical path. When aircraft reaches position predetermined by the calculation, the display system can provide a display to the flight crew to advise the crew regarding a configuration change (for example, extending flaps, speed brakes, and/or landing gear, etc.), thereby allowing the crew to fly the most energy efficient (e.g., with the lowest possible costs) and quiet approach while still assuring that the approach is stabilized and safe.

In a further aspect, embodiments of the present disclosure, using the aforementioned approach algorithm, monitor aircraft parameters as discussed above and in case the standard approach is no longer possible (for example due to the crew ignoring or missing previous advisements from the display system), offer non-standard corrective actions to allow the aircraft to reach a stabilized approach prior to the landing decision altitude (for example, 1000 feet AAL). For example, such non-standard corrective actions include, but are not limited to, the use of speed-brakes, an early landing gear extension, and/or level flight deceleration. These non-standard corrective actions will reduce the current unwanted practice where the crew inadvertently continues to a stabilized approach minimum altitude in an unstable configuration and is thereafter forced to commence a "go around" procedure. It is therefore expected that timely advisements for non-standard corrective actions will increase both flight safety (stabilization of aircraft) and economy (reduced number of go-arounds).

In a further aspect, embodiments of the present disclosure, using the aforementioned algorithm, are configured to evaluate whether the aircraft is able to meet the stabilized approach criteria even with the use of non-standard corrective actions. In the event that even these actions are calculated to be insufficient to bring the aircraft to a stabilized approach prior to reaching the minimum decent altitude, the display system is configured to advise the crew that a stabilized approach is not feasible and to commence a go around procedure. As such, this feature will allow the crew to commence a go-around from a higher altitude, further away from ground obstacles, and with less fuel burning during the climb to the go-around altitude. This can significantly decrease the number of un-stabilized approaches and subsequently the number of approach and landing accidents.

Instructions for a go-around, when inevitable, increase both flight safety (lower risk of continuation in an un-stabilized approach) and economy (shorter climbing part of the go around procedure and shorter distance flown during vectoring for the new approach).

Thus, the algorithm calculates optimum deceleration profile from present position to the touchdown point while taking into account required configuration changes. It evaluates whether stabilization criteria are met by certain point. It evaluates numerous scenarios of configuration changes in order to achieve stabilization and picks the best one based on factors such as fuel efficiency or time, while keeping the safety as the top priority. In case that stabilization cannot be achieved by certain point by any scenario, the crew is informed about this and go around as a safety measure is suggested.

FIG. 1 shows the stabilized approach criteria as recommended by the Flight Safety Foundation and its approach-and-landing accident reduction team. These criteria must be met at the "final gate" which, as used in the present disclosure, means 1000 ft and later 500 ft (for circling approach 300 ft) AAL. The "final gate" is the last point where the aircraft must be stabilized, otherwise an immediate go around is obligatory.

It will be appreciated by those having ordinary skill in the art that every aircraft type is different, and as such no single formula is possible for making the calculations described herein. However, it is expected that a person having ordinary skill in the art will be able to consult any given aircraft reference manual for information regarding aircraft performance with flap extensions, speed brake extensions, landing gear extension, fuel consumption and weight, and other parameters as necessary to configure a system in accordance with the teachings of the present disclosure to perform the calculations described above. It will be appreciated that a person having ordinary skill in the art will be able to adapt these teaching to various aircraft by consulting the appropriate reference manual therefor.

Algorithm Description

The algorithm includes instructions for a list of scenarios which is tailored for particular aircraft type. This list can be adjustable by user of this application (e.g. aircraft operator). Every scenario definition contains: a sequence of configuration changes; a description at what speed next configuration change can be suggested; and a desired vertical profile. Other factors can be included as well.

The sequence of configuration changes refers to what flaps are gradually extended during approach (some aircraft have intermediate flap positions which can be skipped). Every scenario also describes when the landing gear is extended (in some scenarios early gear extension helps increase deceleration and descend rates). Some scenarios contain also a description of usage of other devices which can increase drag such as speedbrakes. Table 1, below, lists exemplary configuration changes in accordance with an embodiment.

TABLE 1

| | | | | | | | | | | |
|---|---|---|---|---|---|---|---|---|---|---|
| One engine | 10 | F1 | 10 | F5 | 10 | GF15 | | | | |
| One engine | 10 | SF1 | 10 | SF5 | 10 | GF15 | | | | |
| One engine | 10 | GF1 | 10 | GF5 | 10 | GF15 | | | | |
| One engine | 10 | SGF1 | 10 | SGF5 | 10 | GF15 | | | | |
| One engine | 10 | LGF1 | 10 | LGF5 | 10 | DGF15 | | | | |
| Both engines | 10 | F1 | 10 | F5 | 10 | GF15 | 10 | GF30 | 10 | GF40 |
| Both engines | 10 | SF1 | 10 | SF5 | 10 | GF15 | 10 | GF30 | 10 | GF40 |
| Both engines | 10 | SGF1 | 10 | SGF5 | 10 | GF15 | 10 | GF30 | 10 | GF40 |
| Both engines | 10 | LGF1 | 10 | LGF5 | 10 | LGF15 | 10 | DGF30 | 10 | DGF40 |
| Both engines | 10 | LGF1 | 10 | DGF5 | 10 | GF15 | 10 | GF30 | 10 | GF40 |
| Both engines | 10 | LSGF1 | 10 | LSGF5 | 10 | LGF15 | 10 | DGF30 | 10 | DGF40 |
| Both engines | 10 | LSGF1 | 10 | DSGF5 | 10 | GF15 | 10 | GF30 | 10 | GF40 |

D descend in level change
S speedbrakes
G gear
F00 flaps
L level flight
V0000 vertical speed descend In some embodiments, the whole process of configuration changes for landing from clean configuration until final configuration is preferably flown as continual deceleration in order to keep fuel consumption at minimum. For this reason there are predefined speeds, at which next flaps are suggested and deceleration can continue. Another reason for these speed definitions is a situation when there is a need for higher deceleration rate, extension of flaps or landing gear at higher speeds will reduce distance required to decelerate. The user of algorithm (e.g. aircraft operator) can express his preference in usage of this method by modifying scenario list. Of course, maximum allowed speeds for every configuration are always considered and the algorithm takes it into account and never suggests any violation of aircraft limitations.

Reference is now made to FIG. 2. The algorithm provides, calculates, or otherwise employs a desired vertical profile for the descent. There is usually more than one way to descend. One standard option is to fly level until reaching glidepath and then following this glidepath for landing (FIG. 2, aircraft D). But if an aircraft gets into situation where following glidepath would lead to unstabilized approach (due to high speed or insufficient configuration at that moment), a new scenario can be used which uses other than standard vertical profile is required. One example can be deploying aircraft configuration in level deceleration above glidepath and when extended flaps and landing gear can generate sufficient drag aircraft initiates descend and capturing the glidepath from above (FIG. 2, aircraft A).

Some scenarios can be to suggest descending before reaching final approach glidepath. For example a scenario which (in order to reduce time to landing) suggests early high speed descend to the cleared altitude (e.g., detected from preselected altitude on Master Control Panel/Guidance Panel/Flight Control Unit, from received datalink ATC instruction, from FMS, etc.) and then longer level deceleration segment before the final approach (FIG. 2, aircraft E). Such early descend scenario would require additional terrain database in order to maintain highest possible level of safety. The whole proposed lateral and vertical profile would then be crosschecked with the terrain database for sufficient clearance from the terrain.

Further possibilities are depicted in FIG. 2: for aircraft above glideslope let it glide and capture aircraft from above without level deceleration segment (FIG. 2, aircraft B); for aircraft above glideslope uses level deceleration but only in such a way to stay within indication area of ILS (FIG. 2, aircraft C).

The algorithm determines the available distance to go until the runway. This information can be read from aircraft flight management system or it can be calculated independently by the algorithm. A combination of these two can provide even better results.

The algorithm can check whether the track prescribed in the FMS (e.g., checking heading and cross-track error) is followed by the aircraft or not (e.g. not followed due to the crew switching to manual flight for visual approach). In case that FMS routing is not followed, the algorithm can also check modes of autopilot being used and compare current flight path of the aircraft with waypoints ahead and evaluate reasons for not following the FMS (e.g. due to visual approach or ATC radar vectoring). This feature can have abilities to learn based on previous visits of the airport, it can be adjustable by aircraft operator, it also can have option for the crew to select what is their intention (e.g., visual approach will be flown). Based on expected intentions the algorithm can propose lateral and vertical path and thus crew and application can have realistic distance to go information. Examples of the new flight path suggested can be visual approach which reaches final approach course at predefined distance before the runway threshold at appropriate altitude, or a circling approach with (predefined or automatically calculated) lateral and vertical profile for the selected runway.

Furthermore, the algorithm is provided predefined list of scenarios (it can be tailored for particular aircraft type and for operators SOPs and other needs) and every scenario is individually evaluated. Evaluation means determination whether the scenario is usable for current situation or not and then supplementing the scenario with other calculated parameters as described below. The first step in evaluation is filtering out all the scenarios which are not reflecting current situation in number of operating engines. Since there could be scenarios for engine or engines out situations, the algorithm will use those only when needed. There could be also scenarios for situations with all engines out to assist pilots in this rare event (in this case a list of nearest suitable and reachable airports can be provided beforehand). It is also possible to detect different conditions of malfunctioned engine(s) (e.g. N1 stuck; engine separation; etc.) and modify deceleration characteristic accordingly (e.g. N1 stuck compared to windmill produces more drag; when engine has separated, drag is reduced).

Figure 3:
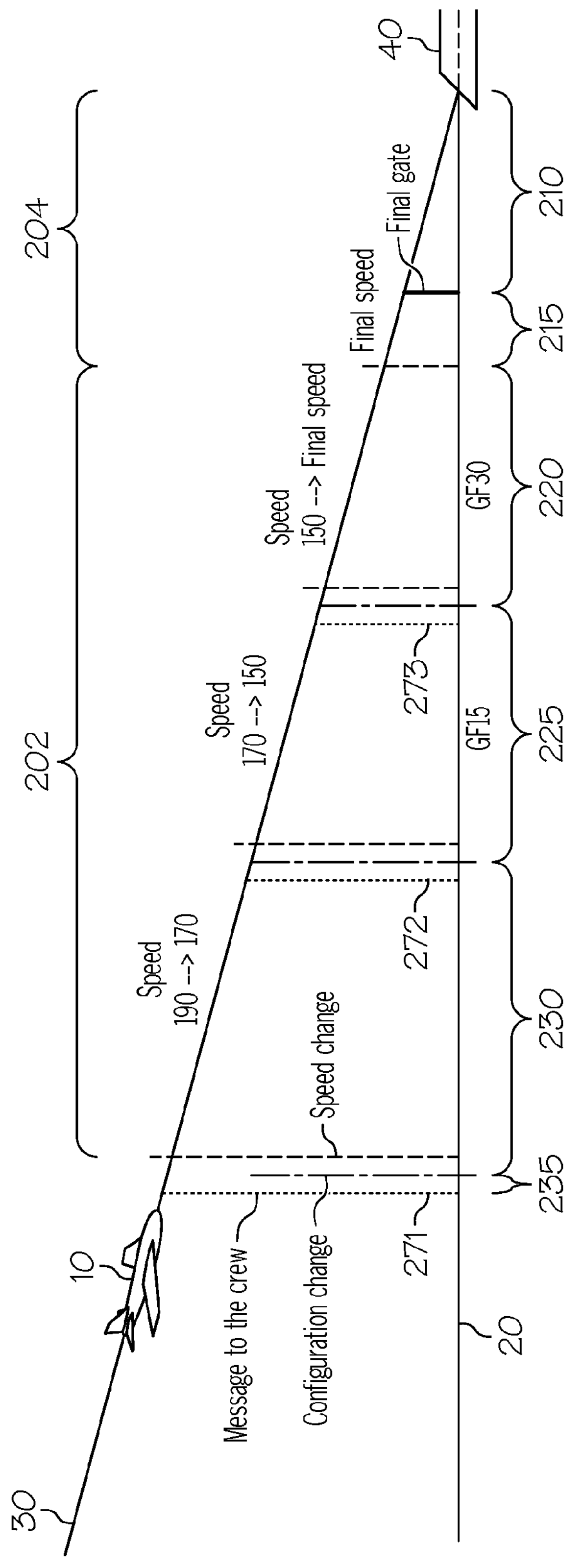
FIG. 3 illustrates exemplary approach advisories and calculations that may be provided on or computed in connection with a display or method for providing a display in accordance with the present disclosure.

In the next step the evaluation process requires calculation of required distance to go (when following configuration changes and vertical profile defined in that particular scenario). FIG. 3, to which reference is now made, describes one of the possible solutions of calculating required distance to go. For simplification this example shows aircraft already established on glidepath and the lateral path is depicted as a straight approach towards the runway, however any lateral flight path can be evaluated when total distance to go and positions of expected turns are provided. The effect of increased drag in turn is then also taken into account.

This solution takes flight phase with one configuration as one segment and calculates the distance required to fly this segment. Calculation can be commenced from the final stabilization gate backwards (towards the aircraft, as on enclosed figure) or from the aircraft position forward (towards the final stabilization gate). In the first case output describes a point where next configuration change should be suggested. If this point is already behind the aircraft, this scenario automatically becomes unusable. The latter option assumes that configuration change will be suggested immediately and thus calculation is initiated at the current aircraft position (or some short distance in front of it) and calculated towards the final stabilization gate, output is the distance to the point where final configuration and final speed is reached. If this point lies behind the final stabilization gate, approach would be unstabilized and therefore this scenario is not usable. The latter option is usually used for scenarios which are not very standard in situations where safety (becoming stabilized as early as possible) has top priority, e.g., scenarios with glidepath capturing from above shortly before final stabilization gate.

During evaluation there can be other additional reasons to exclude scenario as unusable, e.g. vertical speeds required are exceeding maximum allowed vertical speeds in that particular altitude. For evaluation of one scenario algorithm requires at least: aircraft flight model; list of available approach scenarios; current aircraft data, including but not limited to flaps and landing gear position, speedbrakes position, engine RPM, etc.; and aircraft flight data, including but not limited to aircraft position, airspeed, distance to go to the selected runway, selected type of approach, wind information, etc.

It is further required to have a flight model, which describes deceleration characteristics of the aircraft. Source of information about flight model can be database, charts, equations, etc. In order to provide distance required to decelerate from initial speed to final speed, flight model needs to be provided with information: aircraft configuration (flaps, landing gear, speedbrakes, . . . ), initial speed, final speed, what vertical path is flown (e.g. level flight, descend on path with fixed angle), current or predicted aircraft weight, and current and predicted wind velocity. If description of aircraft deceleration with idle thrust in level flight is available, the algorithm can use this to calculate deceleration for various descend angles as well as to calculate angle of descend for flight at constant speed. However, it is also possible to use another source of information (database, charts, equations etc.) where previously mentioned items are supplemented with value of descend angle, in that case in order to determine angle of descend to maintain speed with idle thrust, flight model will require following information: aircraft configuration (flaps, landing gear, speedbrakes, etc.), descend speed, current or predicted aircraft weight, and current and predicted wind velocity.

Example of deceleration characteristics in table form is Table 2, below. The number in the cell shows distance required in order to decelerate from initial speed to final speed (column header). Every row describes one configuration settings of the aircraft.

TABLE 2

| Situation Level decelerations Gross weight 66000 kgs | | | | | | | | | | | | | | | |
|---|---|---|---|---|---|---|---|---|---|---|---|---|---|---|---|
| | 270-260 | 260-250 | 250-240 | 240-230 | 230-220 | 220-210 | 210-200 | 200-190 | 190-180 | 180-170 | 170-160 | 160-150 | 150-140 | 140-130 | 130-120 |
| F0 | 1561 | 1599.28 | 1617.73 | 1479.63 | 1456.89 | 1415.05 | 1402.78 | 1579.12 | 1268.91 | | | | | | |
| F1 | | | | 1150.8 | 1155.63 | 1126.83 | 1199.99 | 1117.09 | 1157.2 | 1005.25 | 1058.73 | 810.81 | | | |
| SF1 | | | | 788.07 | 795.51 | 823.05 | 783.22 | 783.22 | 811.37 | 788.66 | 659.78 | | | | |
| GF1 | | | | 865.28 | 589.71 | 671.31 | 717.93 | 694.62 | 671.3 | 713.71 | 717.92 | 713.71 | | | |
| SGF1 | | | | 494.39 | 566.27 | 713.57 | 660.12 | 624.22 | 624.53 | 636.18 | 643.01 | 616.76 | | | |
| F5 | | | | 913.01 | 1005.7 | 1000.24 | 1028.4 | 1046.87 | 1001.18 | 1000.82 | 865.07 | 846.25 | 717.95 | | |
| SF5 | | | | 608.25 | 624.74 | 636.39 | 749.38 | 706.34 | 752.03 | 694.67 | 647.1 | 602.01 | | | |
| GF5 | | | | 524.59 | 692.61 | 645.98 | 701.38 | 671.23 | 736.34 | 717.85 | 705.87 | 671.84 | 636.25 | | |
| SGF5 | | | | 542.9 | 540.95 | 554.55 | 566.2 | 542.89 | 589.51 | 601.78 | 542.89 | 601.15 | | | |
| F10 | | | | | | | | 9313.99 | 5580.76 | 1296.4 | 1240.73 | | | | |
| SF10 | | | | | | | | 4945.22 | 482.09 | 2864.02 | 8031.55 | 3345.54 | 7080.66 | | |
| GF15 | | | | | | | | | 590.56 | 602.22 | 620.7 | 547.18 | 477.2 | 531.62 | |
| GF30 | | | | | | | | | | | | 431.48 | 453.86 | 500.5 | 484.95 |

Wind information may also be desirable, in some embodiments. Wind information is desirable as an input for the algorithm as wind can significantly affect aircraft deceleration and is frequent reason of an unstabilized approach. On the other hand strong headwind which was not considered during approach will negatively affect fuel consumption and noise levels. There can be various sources of this information and based on this a predicted wind situation for the trajectory can be created. Combining two or more sources can provide best results. Sources of wind information can be: onboard systems (FMS or inertial navigation system), broadcast from the ground stations (processed automatically or read from FMS after manual input of data by the crew), broadcast from other aircraft in the vicinity, especially from those ahead of the particular one and using similar or same trajectory.

Further, with regard to the stabilization gates, it is appreciated that majority of operators use two stabilization gates: 1000 feet AAL and 500 feet AAL stating that 1000 feet gate is mandatory for go around in case of flight in IMC and 500 feet gate is mandatory for go around regardless of weather conditions. In order to reflect this in the algorithm, scenario can be evaluated more than once for different final gate. There is also one special situation (circling approach) where stabilization gate at 300 feet AAL is used. These values are derived from current practice, but they can be easily modified for future, also number of gates during approach can be changed. In one embodiment, the algorithm can use a concept which both increases safety and reduces number of scenarios being evaluated during every algorithm run. It suggests that all scenarios are being evaluated for 1000 feet gate and only in case that no scenario is found as usable, another evaluation of scenarios for 500 feet gate is initiated.

With continue reference to FIG. 3, depicted is an approach scenario, showing an aircraft 10, the ground 20, the approach path 30, and the runway 40. Furthermore, reference will be made to the instructions that would be displayed to the flight crew via the display system, and also to the flight crew response (i.e., whether the flight crew complied with the instructions provided via the display or missed the instructions). Speed is also shown on FIG. 3, with the number being provided in knots. It will be appreciated that the illustrated approach scenarios are merely exemplary and are intended to describe the functioning of the approach algorithm in connection with the display system. As such, it will be appreciated that numerous other approach scenarios are possible, with different types of aircraft, and therefore each algorithm and display system must be appropriately tailored in accordance with the teachings of the present disclosure.

FIG. 3 depicts an exemplary approach scenario where the display system provides advisories for configuration changes. FIG. 3 depicts the situation of an aircraft 10 on the approach glide path 30 upon beginning the approach. Aircraft 10 flies with speed 190 knots and has flaps 1 extended, scenario depicted on FIG. 3 assumes following 3 consecutive steps of configuration changes: flaps 5; gear down and flaps 15; flaps 30. As noted above, the algorithm takes into account the type of aircraft, the aircraft's position (for example, as may be determined by a GPS system, an inertial navigation system, or a ground-based radio system such as a VOR, NDB, ILS, etc.), speed, altitude, weight, configuration (data for which can be obtained from the aircraft's flight manuals), current weather conditions, and other flight parameters. Using this information, the approach algorithm makes (and continuously updates) calculations regarding the optimum aircraft configuration to make fly approach using idle (or near idle) thrust. In an embodiment, the approach algorithm may be configured to output the total distance to the next spatial position where an aircraft configuration change (i.e., lowering of flaps or landing gear) is necessary to meet stabilized criteria at the "final gate." This calculation is executed from the ground 20 upwards and from the runway 40 outwards toward the aircraft (in FIG. 3, from right to left along the model approach path 30). As such, a series of calculations are made for each segment of the model approach, and then the distances summed, and compared to the current position of the aircraft. If the calculated distance to perform the model approach, segment by segment, exceeds the current position of the aircraft 10 from the runway 40, the scenario is considered as unusable—it is too late to use it. If the calculated distance to perform the model approach meets the current position of the aircraft 10 from the runway 40, then scenario is considered as usable. In case that this scenario is later selected to be advised to the crew, then advisory at position 271 is provided by the display (in this case advisory for flaps 5).

With specific reference now to FIG. 3, the aircraft 10 is shown on the model approach path 30. As noted above, the approach algorithm makes the calculations regarding distance needed for a stabilized approach in segments, based on the model approach aircraft configuration. Starting from the runway 40 and moving toward the aircraft 10, segment 210 is the "final gate" segment, where the aircraft must be in a stabilized configuration for landing. Segment 215 is a "safety margin" of a fixed distance, for example about 0.3 NM, because final speed was reached and thrust needs some time to be increased and stabilized before final gate is passed. As such, segment 215 is a constant parameter in the algorithm. Segment 220 is the final deceleration phase of the model approach. The algorithm calculates the distance required to decelerate the aircraft from 150 knots to the final approach speed, with flaps extended in the landing configuration and the landing gear extended. This is just an example, same aircraft can fly this different speed when having different weight. Segments 225 and 230 are intermediate deceleration and descent phases of the model approach. In segment 225, speed is reduced from 170 knots to 150 knots, flaps are extended to 15 degrees, and the landing gear is extended. In segment 230, speed is reduced from 190 knots to 170 knots, and flaps are extended to 5 degrees. Individual calculations of distance are made for each intermediate approach segment, and summed with the previously discussed segments 220, 215, 210. Based on the sum of the calculations for each segment, a total distance is provided by the approach algorithm, as noted above. A comparison is then made to the aircraft 10 position.

The display system of the present disclosure may provide notifications or advisories to the flight crew prior to the aircraft reaching the calculated distance of the next segment. For example, as shown in FIG. 3, the aircraft 10 is approaching the calculated distance of the first intermediate segment 230. In some embodiments, an initial flight crew response time segment 235 may be included to allow time (and therefore distance) for the flight crew to notice the display, directing the flight crew to initiate approach procedures (i.e., by beginning to lower the flaps as in intermediate segment 230). This fixed distance may be 0.1 or 0.2 NM, as desired. Such a response time segment 235 is provided prior to each approach segment (distance between 272 and beginning of segment 225, distance between 273 and beginning of segment 220).

In instances where too many advisories have been missed, and there is simply no way for the aircraft to achieve a stabilized approach prior to the final gate a "go-around" advisory is issued at the point where the algorithm calculates that a stabilized landing is no longer possible, which is higher than final gate and thus reducing the cost associated with the climb to go around altitude.

Figure 4A:
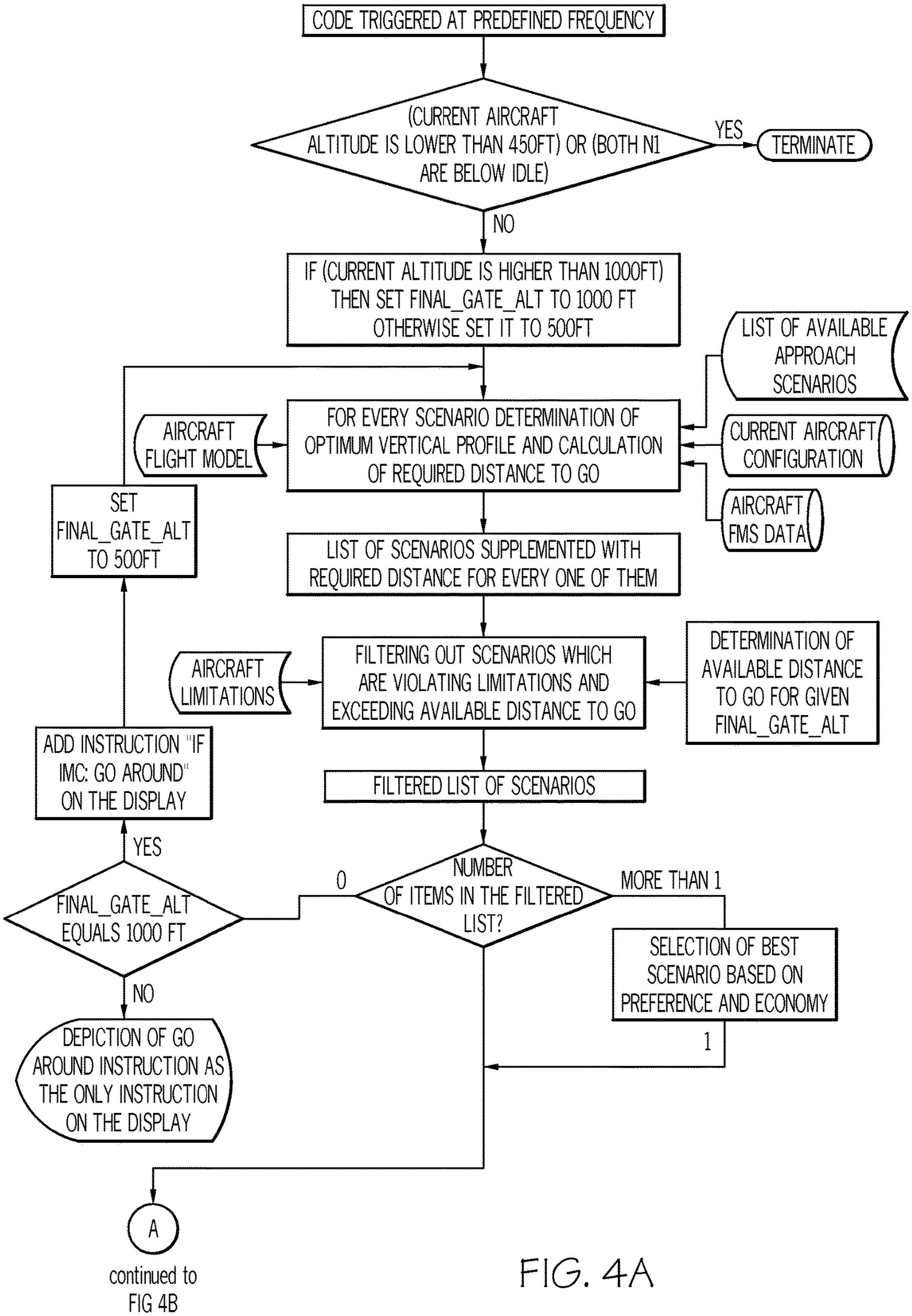
FIG. 4 is a flowchart of an exemplary algorithm in accordance with an embodiment of the present disclosure.
Figure 4B:
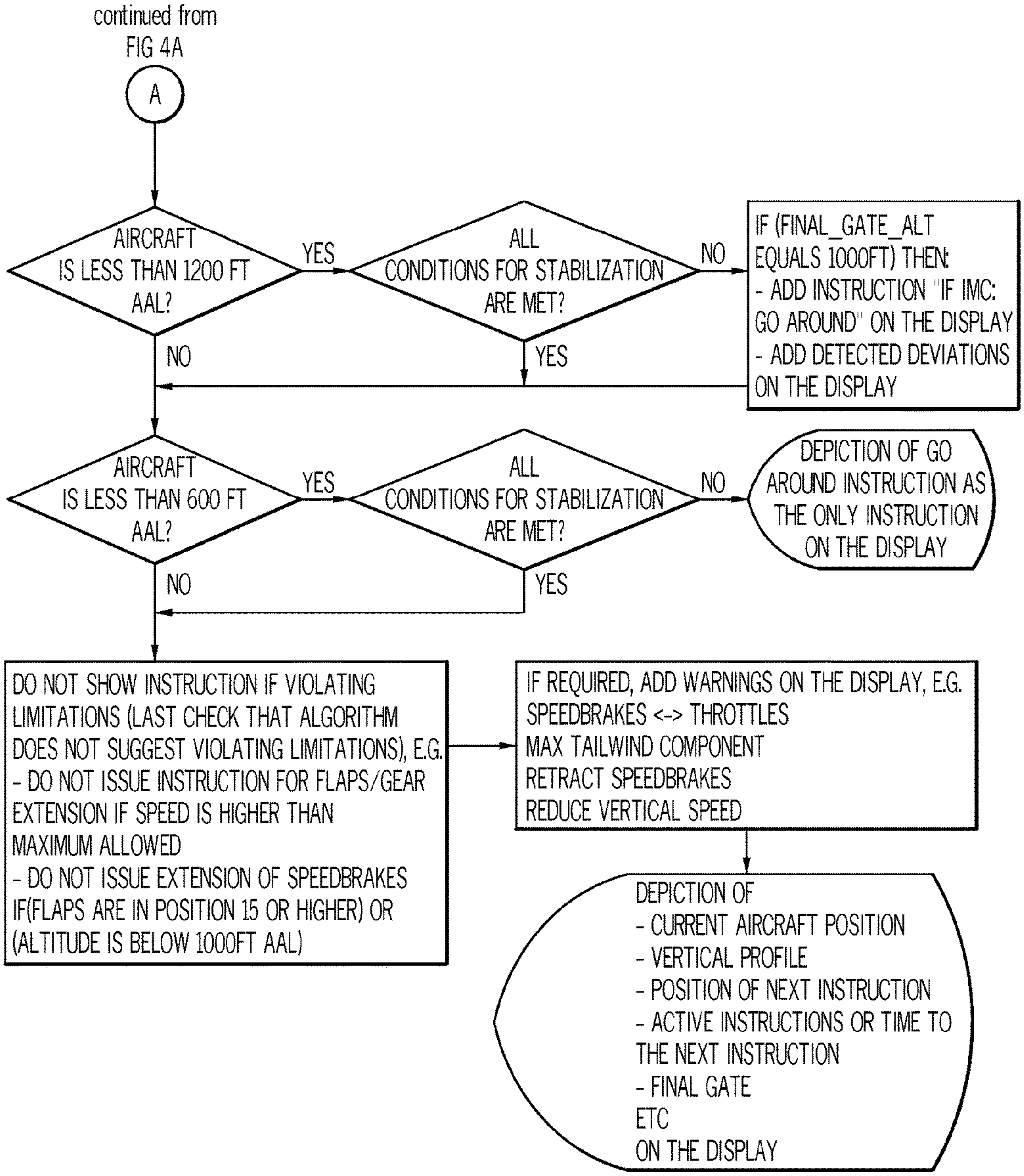

In one embodiment, an exemplary flowchart of an embodiment of the algorithm is depicted with reference to FIG. 4. Of course, various modifications can be made thereto, in accordance with the description provided above.

As such, as previously described, a list of scenarios which passed through evaluation as usable has been built. It will be referred to as a list of available scenarios. From this list the best scenario can be chosen considering numerous factors reflecting different preferences of operators, requirements of specific aircraft type or safety aspects. In one example, it is desirable to rank scenarios from most preferred to least preferred.

In order to take economy into account every scenario can be also accompanied by value describing amount of fuel which needs to be saved when flying this particular scenario in order to move it higher in ranking. It is also possible for every scenario to calculate total distance during which throttles are not in idle position and give scenarios with small value of this distance a priority. In order to introduce other factors for decisions (e.g., when a scenario uses not very standard procedures), it is possible to assign every scenario a value of amount of fuel which needs to be saved and then transfer this amount into distance using formula:

$$\text{distance additive} = (\text{airspeed} + TWC)\frac{ScenarioSaving}{FuelFlow \text{ on idle}}$$

Wherein TWC refers to the tail wind component. And then subtract this distance from total distance flown on idle thrust. It is also possible to use sophisticated methods to calculate for every scenario amount of fuel which is going to be used and use that as one parameter for deciding the best scenario.

Time to landing is another example of factor which can be added into the selection process. Selection of scenario can be also interconnected with previous step where every scenario is individually evaluated for usability and if some scenario in the list is detected as desired, evaluation of other scenarios can be stopped earlier to save computation resources of the hardware. Scenarios can be divided into ranked groups where any scenario from higher group is always preferred over scenario from lower group. For example first group contains scenarios using standard procedures, second contains scenarios with nonstandard corrective actions like level deceleration. In that case if during evaluation of scenarios there's at least one scenario from the first group acknowledged as usable, scenarios from the second group are all skipped. Selection of best scenario is then commenced only with scenarios from the first group.

Selection of scenario can be also dynamic, that is, based on variable parameters, e.g., when the delay for landing is higher than predefined time value, scenarios which require shorter time of flight are automatically preferred (and its weight can be based on cost index value from the FMS for instance). Also, the pilot can be allowed to interfere with the selection of scenario (e.g. by means of modifying weight of one or more parameters being used during selection, by manual selection of preferred scenario from the list which is provided to him via HMI, etc.).

A hysteresis mechanism is also desirable in connection with the presently described algorithm. In order to implement hysteresis into the algorithm, it is required to store information about scenario suggested in previous run of algorithm along with timestamp when it was suggested for the first time. If this scenario is being suggested for shorter time than predefined value (e.g. 10 seconds) and if this scenario is found among usable scenarios during current algorithm run, this scenario can be suggested right away and further searching for the best scenario can be skipped. There can be also decisive section implemented which determines ratio between fuel efficiency and safety of previous scenario and the best scenario in current list and together considering timestamp value (time from last change of scenario depicted to pilot) it can decide when it is feasible to change scenario. This can help to optimize number of new instructions which pilot is required to process, it can sometimes lead to very short hysteresis (sudden change of scenario for sake of safety or economy) or sometimes it can leave the best scenario (but not so much better than others) unused.

In some instances, it will be desirable for the algorithm to issue advice to "go-around." Normally decision for go around is being done by crew in final gate altitude (1000 feet, 500 feet or even 300 feet AAL) so not very high above the ground (and quite deep below go around altitude). Proposed algorithm can determine situation where there is no scenario for which aircraft can become stabilized by final gate much higher. This happens when list of usable scenarios (list of scenarios which passed evaluation as usable) does not contain any items. Behavior of go around advice in situation where user prefers to use more than one stabilization gate (e.g. 1000 feet AAL for IMC and 500 feet AAL regardless of weather conditions) depends on whether there is a means to determine weather conditions at the particular final gate or not. In case that weather information are not available, go around advice is provided as a conditional statement (e.g. for 1000 feet gate: "if IMC: GO AROUND; if VMC: set flaps 40"). This logic can be handled within algorithm in case that weather information is provided. It also depends on how reliable weather data are and where is the margin for algorithm to accept responsibility for decision in such conditional case. For instance when visibility higher than 10 kilometers and no clouds have been recently reported from particular airport during daytime, algorithm can evaluate this as VMC, but when cumulus clouds at altitude of stabilization gate has been reported, only pilot can determine whether he/she has visual contact with the ground or not.

Further, apart from the elements of stabilization such as flaps, landing gear or speed, there are additional parameters which when not satisfied can give crew a reason for go around (such as vertical, horizontal or heading deviations, abnormal pitch or bank angle etc.). These parameters can be monitored during the approach and crew can be informed about excessive values, or this monitoring can be skipped (assuming that crew is aware of them) and their evaluation can be initiated shortly before final gate in order to assess all relevant information for potential go around advice. If a deviation is detected (e.g. sudden increase of speed due to wind gust, deviation from the vertical flight path), algorithm can also determine whether there is enough time and space to correct this deviation until certain point (e.g. lower final gate) and if not, crew can be advised for a go around.

Additionally, the present algorithm can monitor additional parameters or conditions which are closely connected with stabilization of the aircraft safety of approach and landing. If necessary, algorithm can issue warnings for the crew (e.g. "Max tailwind component", "Speedbrakes <->Throttles", "Excessive vertical speed", etc.).

Additional considerations can be incorporated into the algorithm for instances wherein the aircraft passes the final gate. When aircraft passes final stabilization gate, it can be either turned off or it can provide continual monitoring of parameters which influence stabilized approach and also landing. In case that some deviation from these parameters is detected, crew can receive warning. Algorithm can also determine whether there is enough time to correct this deviation until certain point (e.g. runway threshold) and if not, crew can be advised for a go around.

At predetermined altitude or distance (based on aircraft type) algorithm can also calculate (based on current flight parameters) how a flare maneuver is going to look like and predict touchdown point position and aircraft speed at touchdown. In case that these predicted values are out of predefined margins, an alert or advice for go around can be issued to the crew. Algorithm can be also extended for calculation of required distance for rollout and in case that required distance exceeds available distance, crew can be warned about this and go around suggested even when still in the air.

Figure 5:
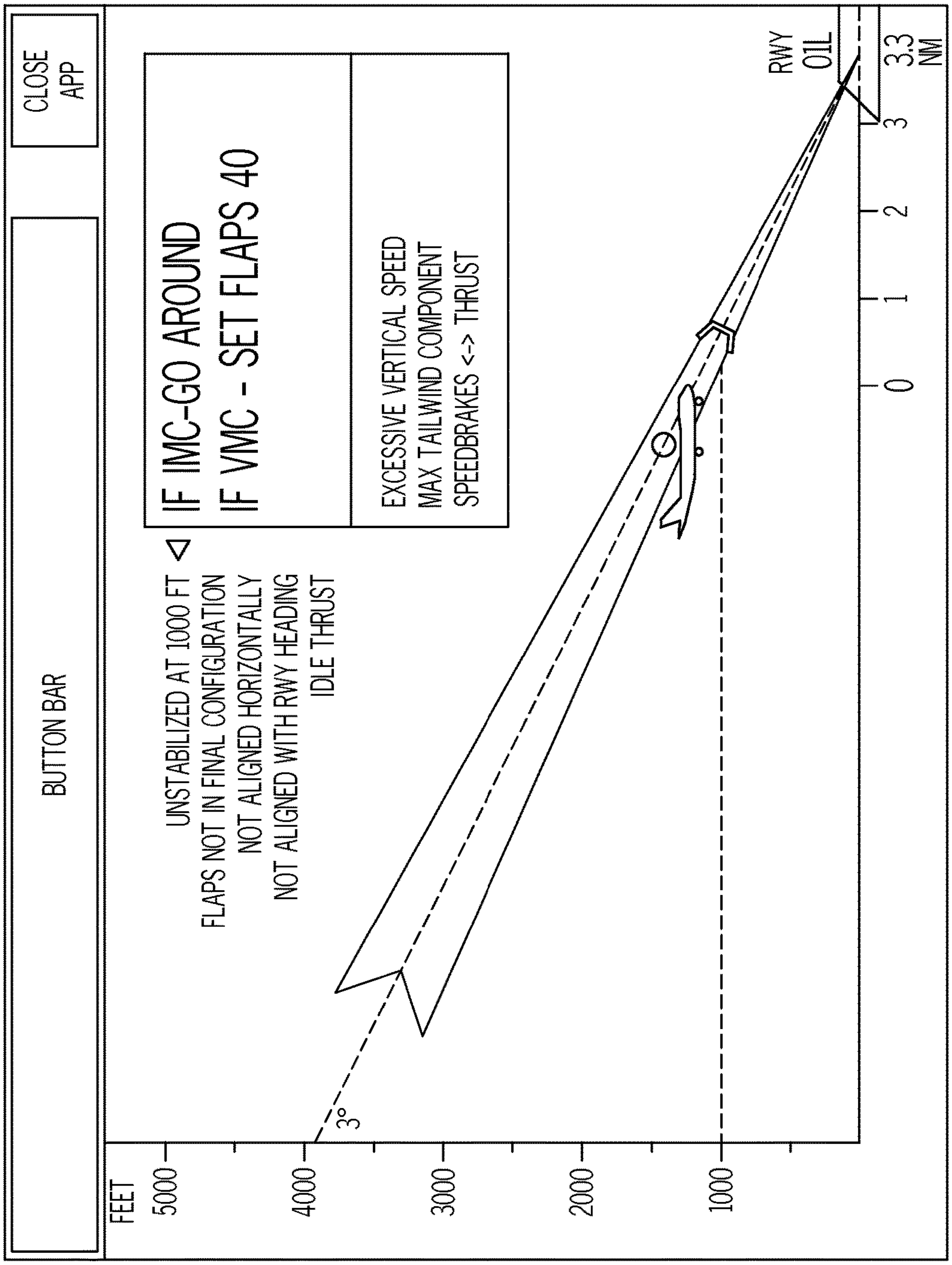
FIG. 5 illustrates an exemplary implementation of a display in accordance with an embodiment of the present disclosure.

As noted above, the algorithm can dispense the previously described information to the flight crew in one or more displays, which can take on various forms. In an exemplary embodiment, the algorithm can be utilized in a dedicated Electronic Flight Bag application or as an extension of another one. Such an implementation is depicted with regard to FIG. 5.

In other embodiments, the algorithm can also be used as a built-in part of aircraft avionics. Regardless of the form, quality of output and availability of some features depend on amount of data available to the algorithm. For example when full access to the FMS is provided, algorithm can take into account all the constraints for routing ahead of the aircraft. When modifications in routing or speed/altitude constraints are detected (e.g. manual adjustments by the crew, datalink instructions from ATC, etc.), the algorithm can instantly react and recalculate scenarios to reflect new situation. Standalone application (EFB) can compensate for some missing data by providing crew with the interface to manually insert data which are not automatically available via data transfer from the aircraft.

In other embodiments, the algorithm can be also implemented in Unmanned Air Systems. Output of the algorithm can help operator of the aircraft in decision making process or it can feed autonomous onboard control unit itself which can consequently change aircraft configuration.

With regard to the operation of the exemplary display, it can be activated manually or automatically based on one or more conditions (e.g. distance from the destination aerodrome, passing top of descend, etc.). Deactivation can be also manual or automatic (e.g. when go around is initiated by the crew, below certain altitude, after passing runway threshold etc.).

With regard to incorporation of air traffic control (ATC) information, proposed application can also communicate its outputs with the ATC. Examples of usage of this communication are: ATC controller is provided with the information where aircraft can become stabilized; ATC controller is provided with the information about earliest point where aircraft can reach particular speed; ATC controller can see various scenarios usable for the aircraft and also he/she can send back to the aircraft his/her preference; ATC controller can propose change in lateral or vertical routing and aircraft sends back information how is the deceleration and stabilization affected. The ATC controller can then drop the change even without need of communicating directly with the crew. These features will be particularly beneficial when human ATC controller is replaced by some form of automation.

In accordance with the present disclosure, therefore, it will be appreciated that the algorithm is able to determine when it is the best time to change aircraft configuration. Therefore it is possible to connect algorithm with units responsible for changing aircraft configuration and operate them automatically without requirement of human input. For instance the algorithm can inform the crew about coming automatic configuration change (e.g. setting flaps to the next step, extend landing gear, retract speedbrakes, etc.) and commence the announced action in case that crew did not reject this instruction.

In other embodiments, the algorithm may optionally be extended by the inclusion of some form of context monitor that gathers information from various channels about crew status and overall situation (e.g. crew workload, crew stress levels, crew fatigue, aircraft malfunctions, ATC requests etc.) and evaluates it. Based on its output the algorithm can utilize adaptive behavior. Examples include, but are not limited to: adjustments in selection of scenario process (e.g. it can suggest scenario which is standard and require minimum actions for moments when high workload is detected); modified modalities when communicating with the crew (e.g. for high workload an instruction is accompanied with aural elements); and automatic actions performed in the cockpit (e.g. automatic gear extension when it is evaluated as safe and if the crew has high workload due to other factors), for example.

It will be appreciated that in all examples disclosed above, the approach algorithm requires access to the flight parameters, noted above, as gathered by the aircraft's on-board computerized sensing systems. Additionally, the algorithm must be tuned for each aircraft, using data available in the aircraft reference manual.

Figure 6:
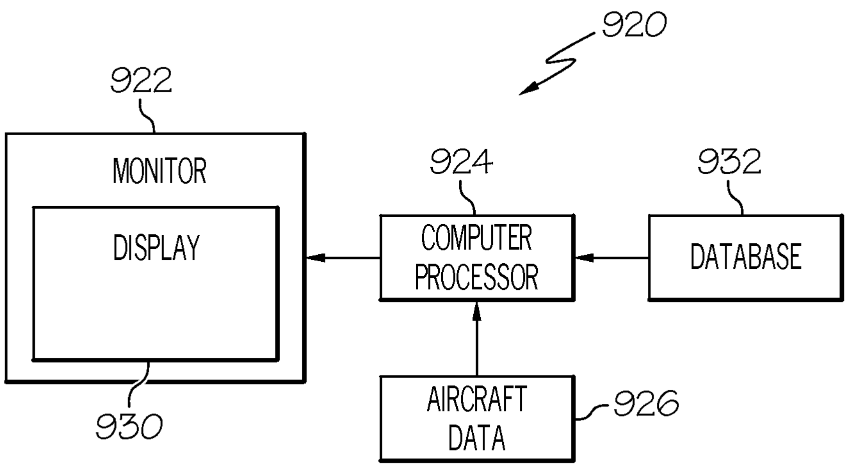
FIG. 6 is a functional block diagram of a generalized flight display system suitable for use with an embodiment of the present disclosure.

As previously discussed, it is envisioned that embodiments of the present disclosure are designed to operate on or in conjunction with a computer-implemented display system for providing notifications and advisories to the flight crew. FIG. 6 is a functional block diagram of a generalized flight display system 920. Flight display system 920 includes at least one monitor 922, a computer processor 924, and a plurality of data sources 926 including data from sensors onboard the aircraft. Sensor data 926 can pertain to any sensed condition on the aircraft or outside of the aircraft, including but not limited to engine data, avionics data, altitude data, flight controls data, positional data, fuel data, weather data, and any other types of aircraft data for which a condition can be sensed.

Monitor 922 may include any suitable image-generating device including various analog devices (e.g., cathode ray tube) and digital devices (e.g., liquid crystal, active matrix, plasma, etc.). Computer processor 924 may include, or be associated with, any suitable number of individual microprocessors, memories, power supplies, storage devices, interface cards, and other standard components known in the art. In this respect, the computer processor 924 may include or cooperate with any number of software programs or instructions designed to carry out the various methods, process tasks, calculations, and control/display functions described above.

During operation of flight display system 920, computer processor 924 drives monitor 922 to produce a visual display 930 thereon. In one group of embodiments, display system 920 may be deployed on the flight deck of an aircraft. In such embodiments, monitor 922 may assume the form a Multi-Function Display (MFD) included within a Crew Alert System (CAS), such as an Engine Instrument and Crew Advisory System (EICAS). Similarly, processor 924 may assume the form of, for example, a Flight Management Computer of the type commonly deployed within a Flight Management System (FMS). Sensed aircraft data sources 926 may, in addition to the data discussed above, include one or more of the following systems: a runway awareness and advisory system, an instrument landing system, a flight director system, a weather data system, a terrain avoidance and caution system, a traffic and collision avoidance system, a terrain database, an inertial reference system, and a navigational database.

A database 932 may be included for storing data relating to the above described systems and methods, for example, approach algorithm computerized instructions, approach data, and aircraft data, among other things.

Figure 7:
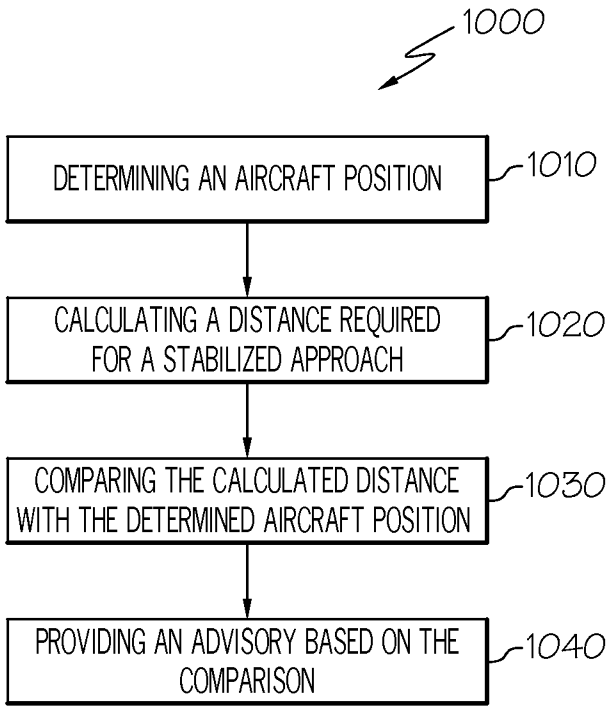
FIG. 7 is an exemplary flow diagram illustrating a method for generating a flight display in accordance with the present disclosure.

In an embodiment, as shown in FIG. 7, a flow diagram is provided illustrating a method 1000 for generating a flight display in accordance with the present disclosure. At step 1010, the aircraft position is determined. At step 1020, the approach algorithm calculates the required distance to achieve a stabilized approach. At step 1030, the calculated distance is compared to the determined position of the aircraft. Finally, at step 1040, a display is generated that provides an advisory based on the comparison, for example display system 920 described above.

As such, disclosed herein is a display system and a method for generating a display provided to help a flight crew to dissipate an aircraft's kinetic and potential energy to allow for a stabilized approach. That is, the presently described embodiments allow the aircraft to slow and descend to an approach configuration prior to reaching the "final gate," using the minimum amount of fuel possible and creating the minimum amount of noise possible. The system operates on an algorithm that monitors the current flight parameters and assists the flight crew in making adjustments to the configuration of the aircraft when the aircraft is making an approach to an airport.

While the present disclosure has provided exemplary embodiments directed to a flight display system, it will be appreciated that the embodiments presented herein can be extended to other applications where approach assistance may be desirable, and where approaches may be improved through the use of a display. For example, other suitable applications may include maritime applications, railroad applications, industrial/manufacturing plant applications, space travel applications, simulator applications, and others as will be appreciated by those having ordinary skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is being understood that various changes may be made in the function and arrangement of elements described in an exemplary embodiment without departing from the scope of the invention as set forth in the appended claims.

What is claimed is:

1. A method for generating a flight display, comprising:

determining a position of an aircraft with reference to an airport, the position comprising an altitude and a lateral position with respect to an approach procedure for the airport;

calculating a distance required for the aircraft to decelerate and descend for entering a final approach gate of the airport in a stabilized configuration, wherein deceleration comprises a reduction in aircraft thrust, an extension of aircraft flaps, and an extension of aircraft landing gear;

comparing the position of the aircraft with the distance required for the aircraft to decelerate and descend so as to arrive at a final gate of the airport in a stabilized aircraft configuration; and generating a flight display comprising an advisory based on a result of the comparing, wherein generating the flight display comprises:

(1) based on the calculated distance and the comparing, issuing a first graphical advisory via the flight display to perform the reduction in aircraft thrust;

(2) based on the calculated distance and the comparing, at a time subsequent to issuing the first graphical advisory, issuing a second graphical advisory to perform the extension of aircraft flaps; and (3) based on the calculated distance and the comparing, at a time subsequent to issuing the second graphical advisory, issuing a third graphical advisory to perform the extension of aircraft landing gear.

2. The method of claim 1, wherein determining a position of the aircraft is performed using one or more of a GPS system, an inertial navigation system, or a ground-based radio system.

3. The method of claim 1, wherein calculating a distance required for the aircraft to decelerate and descend is performed using a computerized approach algorithm.

4. The method of claim 3, wherein the computerized approach algorithm is configured to calculate a plurality of segment distances, each segment distance corresponding to an aircraft configuration change in accordance with one of the first, second, or third graphical advisories.

5. The method of claim 4, wherein the computerized approach algorithm is configured to sum the plurality of segment distances to calculate the distance required for the aircraft to decelerate and descend.

6. The method of claim 4, wherein the computerized approach algorithm is configured to calculate the plurality of segment distances based on one or more of an aircraft type, and aircraft weight, a weather condition, an aircraft airspeed, an aircraft altitude, and an aircraft configuration.

7. The method of claim 1, wherein the advisory further comprises issuing a fourth graphical advisory after issuing the first, second, or third graphical advisory, the fourth graphical advisory comprising a non-standard response where the result of the calculated distance and the comparing indicates that the aircraft is not following a model approach.

8. The method of claim 7, wherein the non-standard response comprises one or more of a level altitude deceleration, an early landing gear extension, or a speed-brake extension.

9. The method of claim 1, wherein the reduction in aircraft thrust comprises a reduction to idle thrust.

10. The method of claim 1, wherein the aircraft descends and decelerates subsequent to generating the flight display step (1) and during generating the flight display steps (2) and (3).

11. The method of claim 1, further comprising issuing a fourth graphical advisory that the aircraft has arrived at the final gate in the stabilized configuration if the aircraft has arrived at the final gate in the stabilized configuration.

12. The method of claim 1, further comprising issuing a fourth graphical advisory to go-around if the aircraft has arrived at the final gate in an un-stabilized configuration.

13. A computer-implemented flight display system comprising:
- a database;
- an electronic display device; and
- a computer processor, wherein the computer processor is configured to:
  - determine a position of an aircraft with reference to an airport, the position comprising an altitude and a lateral position with respect to an approach procedure for the airport;
  - calculate a distance required for the aircraft to decelerate and descend for entering a final approach gate of the airport in a stabilized configuration, wherein deceleration comprises a reduction in aircraft thrust, an extension of aircraft flaps, and an extension of aircraft landing gear;
  - compare the position of the aircraft with the distance required for the aircraft to decelerate and descend so as to arrive at a final gate of the airport in a stabilized aircraft configuration; and
  - generate a flight display comprising an advisory based on a result of the comparing, wherein generating the flight display comprises:
- (1) based on the calculated distance and the comparing, issuing a first graphical advisory via the flight display to perform the reduction in aircraft thrust;
- (2) based on the calculated distance and the comparing, at a time subsequent to issuing the first graphical advisory, issuing a second graphical advisory to perform the extension of aircraft flaps; and
- (3) based on the calculated distance and the comparing, at a time subsequent to issuing the second graphical advisory, issuing a third graphical advisory to perform the extension of aircraft landing gear wherein the database and the electronic display device are in operable communication with the computer processor for displaying the flight display on the electronic display device.

14. The flight display system of claim 13, wherein determining a position of the aircraft is performed using one or more of a GPS system, an inertial navigation system, or a ground-based radio system.

15. The flight display system of claim 14, wherein calculating a distance required for the aircraft to decelerate and descend is performed using a computerized approach algorithm.

16. The flight display system of claim 15, wherein the computerized approach algorithm is configured to calculate a plurality of segment distances, each segment distance corresponding to an aircraft configuration change in accordance with one of the first, second, or third graphical advisories.

17. The flight display system of claim 16, wherein the computerized approach algorithm is configured to sum the plurality of segment distances to calculate the distance required for the aircraft to decelerate and descend.

18. The flight display system of claim 16, wherein the computerized approach algorithm is configured to calculate the plurality of segment distances based on one or more of an aircraft type, and aircraft weight, a weather condition, an aircraft airspeed, an aircraft altitude, and an aircraft configuration.

19. The flight display system of claim 13, wherein the advisory further comprises issuing a fourth graphical advisory after issuing the first, second, or third graphical advisory, the fourth graphical advisory comprising a non-standard response where the result of the calculated distance and the comparing indicates that the aircraft is not following a model approach.

20. A method for generating a flight display, comprising:
- determining a position of an aircraft with reference to an airport, the position comprising an altitude and a lateral position with respect to an approach procedure for the airport;
- calculating a distance required for the aircraft to decelerate and descend for entering a final approach gate of the airport in a stabilized configuration, wherein deceleration comprises a reduction in aircraft thrust, an extension of aircraft flaps, and an extension of aircraft landing gear;
- comparing the position of the aircraft with the distance required for the aircraft to decelerate and descend so as to arrive at a final gate of the airport in a stabilized aircraft configuration; and
- generating a flight display comprising an advisory based on a result of the comparing, wherein generating the flight display comprises:

(1) based on the calculated distance and the comparing, issuing a first graphical advisory via the flight display to perform the reduction in aircraft thrust;

(2) based on the calculated distance and the comparing, at a time subsequent to issuing the first graphical advisory, issuing a second graphical advisory to perform the extension of aircraft flaps; and (3) based on the calculated distance and the comparing, at a time subsequent to issuing the second graphical advisory, issuing a third graphical advisory to perform the extension of aircraft landing gear, wherein calculating a distance required for the aircraft to decelerate and descend is performed using a computerized approach algorithm, wherein the computerized approach algorithm is configured to calculate a plurality of segment distances, each segment distance corresponding to an aircraft configuration change, wherein the computerized approach algorithm is configured to sum the plurality of segment distances to calculate the distance required for the aircraft to decelerate and descend, and wherein the computerized approach algorithm is configured to calculate the plurality of segment distances based on one or more of an aircraft type, and aircraft weight, a weather condition, an aircraft airspeed, an aircraft altitude, and an aircraft configuration.

* * * * *